(12) United States Patent
Baker et al.

(10) Patent No.: US 7,293,709 B2
(45) Date of Patent: Nov. 13, 2007

(54) DETECTION OF TAMPERING OF A SMART CARD INTERFACE

(75) Inventors: Keith Baker, Eindhoven (NL); Johannes Maria Pleunis, Helmond (NL)

(73) Assignee: NXP B.V., Eindhoven (NL)

( * ) Notice: Subject to any disclaimer, the term of this patent is extended or adjusted under 35 U.S.C. 154(b) by 136 days.

(21) Appl. No.: 10/542,388

(22) PCT Filed: Dec. 4, 2003

(86) PCT No.: PCT/IB03/05971

§ 371 (c)(1),
(2), (4) Date: Jul. 14, 2005

(87) PCT Pub. No.: WO2004/063970

PCT Pub. Date: Jul. 29, 2004

(65) Prior Publication Data
US 2006/0038011 A1    Feb. 23, 2006

(30) Foreign Application Priority Data
Jan. 14, 2003 (EP) ................. 03100046

(51) Int. Cl.
*G06K 5/00* (2006.01)

(52) U.S. Cl. ............... 235/437; 235/436; 235/486; 235/492

(58) Field of Classification Search ......... 235/439, 235/441, 436, 438, 486, 437
See application file for complete search history.

(56) References Cited

U.S. PATENT DOCUMENTS 5,416,423 A * 5/1995 De Borde ............... 324/677
7,000,836 B2 * 2/2006 Saeki ..................... 235/451
7,080,789 B2 * 7/2006 Leaming ................ 235/492

FOREIGN PATENT DOCUMENTS

JP         01035677 A  *  2/1989

* cited by examiner

*Primary Examiner*—Seung Ho Lee

(57) ABSTRACT

This invention relates to a method (and a corresponding terminal) of detecting a presence of a circuit extending arrangement inserted between a physical interface, connected to a terminal, and a smart card, the physical interface being adapted to receive the smart card, the method comprising the steps of measuring at least one electrical characteristic of the physical interface, and determining whether a circuit extending arrangement, changing at least one characteristic of said physical interface, is coupled to said physical interface on the basis said measurement. In this way, simple and efficient detection of a tampering/spy circuit is provided.

13 Claims, 2 Drawing Sheets

DETECTION OF TAMPERING OF A SMART CARD INTERFACE

FIELD OF THE INVENTION

The invention relates to a method, and a corresponding terminal, of detecting a presence of a circuit extending/tampering arrangement.

BACKGROUND OF THE INVENTION

Smart cards are commonly used in a wide range of applications for the purpose of authority check, payment, satellite TV, data storage, etc. As an example the health insurance and banning industries use smart cards extensively. A smart card usually resembles a credit card in size and shape, but typically contains an embedded microprocessor inside. A terminal with a card reader communicates with the microprocessor which controls access to the data on the card. Smart cards may e.g. be used with a smart card reader attached to or located in a personal computer to authenticate a user, etc. Smart card readers can also be found in mobile phones for SIM reading and vending machines.

For a private and/or in-home terminal with a smart card reading capability, such as a set top box (STB), integrated digital television (IDTV), Digital TVs, home gateways, access systems, GSMs, Internet audio sets, car systems, etc. the possibilities to spy on the electronic communication between a smart card and/or a secure access card and the terminal is much greater than in a public automated teller machine (ATM) or similar semi-public/public terminals e.g. used for/in connection with e-commerce. This enables attack on the smart card that is not possible with conventional smart card applications in public and/or semi-public terminals, due to the operation in a private sphere.

A financial and service industry consortium Finread in Europe is attempting to standardize a form of e-commerce terminals used in public ATM and personal computers (PCs), and also for future STBs, IDTV and similar home terminals. Up until now, the consortium has focused on expensive tamper detection and tamper resistant constructions for home e-commerce terminals. Embedded Finread is a part of the Finread consortium examining the issues of low-cost terminals for e-commerce such as IDTV, Java terminals and STBs. The cost of temper resistant and other counter measures normally adopted for dedicated terminals (i.e. ATMs) are considered too complex and/or expensive for the low cost home terminals.

A variety of smart cards/secure access cards exist, some with no sophisticated processing power, typically memory only cards. Other cards, typically so-called multi-application/multi-function cards, comprise more advanced properties and functions typically providing secure authentication of the user/owner of the card e.g. in relation to gaining access to equipment, accounts, functions, transfer of money, e-commerce applications, etc.

Such cards have on-card dynamic data processing capabilities and allocate card memory into independent sections assigned to a specific function and/or application.

The multi-application/multi-function smart card is distributed by one issuer but allows two or more applications/functions to be resident on the smart card. Typically, advanced 32-bit processor cards are used for this purpose.

A Java smart card is a smart card with a Java Virtual Machine (JVM that allows applications to enter and reside on the card. In this way, a Java smart card is a first step towards multi-application smart cards.

As mentioned traditional smart cards only run one process, while a Java smart card have the capability to run multiple processes on the card, which is an enhancement of the smart card protection capability that allows the smart card not only to perform secured transaction, but also to monitor itself and the presence of an attack.

A device typically designated a sub-terminal is a device which includes some features of a terminal, i.e. user input, display, storage and a remote connection to the Internet, or a broadcast channel, but not all. Thus a terminal is complete, and examples are e.g. IDTV, STB or GSM (or similar cellular systems like 3G, UMTS, GPRS, etc.), but a sub-terminal is incomplete. In this way, a sub-terminal is a low-cost version of a terminal that provides some but not all the functionality of a terminal. One example of a sub-terminal is e.g. a TV remote control. The sub-terminal may e.g. also be the conditional access module (typically denoted POD (point of deployment) in the US) of the conditional access system implemented in a STB and/or a TV. The conditional access module is a DVB based term derived from the Common Interface concept for DVB terminals.

Most system can be attacked successfully by a sufficiently resourced attacking entity. It is however necessary to provide sufficient defense (protection and/or detection) against a reasonably resourced security attack or at least provide counter measures that are sufficient to make a single form of attack no more successfully than others. It is also desirable to enable this in an inexpensive way.

A fake terminal can be used to gain access to an unwary user's pin-code or other application information of the card, which is hard to defend against, and would require other protection/detection schemes than provided by the present invention.

However, a typical security attack on genuine terminals/sub-terminals is the insertion of circuit extending equipment like an extender, sampling circuit(s), emulation circuit(s), etc. in the electrical signal path(s) between a terminal and a smart card, where the circuit extending equipment is coupled both to the smart card to be observed and to any electrical equipment which is used to spy on the communication between the card and the terminal.

OBJECT AND SUMMARY OF THE INVENTION

It is an object of the invention to provide a method (and corresponding terminal) of detecting a presence of a circuit extending/tampering arrangement, where the method (and system) provides detection and/or protection against inserted fraud equipment. A further object is to provide this in an inexpensive way. Yet a further object is to enable this using a minimum of electrical measurements.

This is achieved by a method of detecting a presence of a circuit extending arrangement inserted between a physical interface, connected to a terminal, and a smart card, the physical interface being adapted to receive the smart card), the method comprising the steps of:

measuring at least one electrical characteristic of the physical interface, and determining whether a circuit extending arrangement, changing at least one characteristic of said physical interface, is coupled to said physical interface on the basis said measurement.

In this way, detection of a circuit extending arrangement is provided.

In one embodiment, the step of measuring comprises:

measuring a first current provided from said terminal to said smart card via said physical interface, measuring a second current returned from said smart card to said terminal, and in that said method further comprises the step of
comparing whether said first and said second current is substantially equal, and if not determining that a circuit extending arrangement is present.

Hereby, a very simple and reliant way of detecting a circuit extending arrangement is obtained.

In one embodiment, the method further comprises a step of:
comparing said measured at least one electrical characteristic with at least one electrical characteristic as calibrated during manufacture.

In one embodiment, the physical interface has been calibrated to create at least one viable, but non-stable, electrical property at the physical level, the at least one property allowing normal transaction with said smart card, but causing the interface to fail if an circuit extending arrangement is coupled to said physical interface.

Hereby, the failure of the interface would thus resist the attack of tampering directly.

In one embodiment, the at least one non-stable electrical property relates to current and/or voltage characteristics of said physical interface.

In one embodiment, the method further comprises the step of:
regulating the use of the smart card on the basis of said step of comparing.

In this way, the terminal could e.g. either warn the user and/or the card issuing authority (e.g. using the communications/IP link). The transaction, the access, etc. relating to the card would then be terminated and/or carefully monitored by the execution/issuing authority.

The present invention also relates to a terminal corresponding to the method according to the present invention.

More specifically, the invention relates to a terminal for detecting a presence of a circuit extending arrangement inserted between a physical interface, connected to said terminal, and a smart card, the physical interface being adapted to receive said smart card, the terminal comprising a monitoring circuit comprising
means for measuring at least one electrical characteristic of the physical interface, and
means for determining whether a circuit extending arrangement, changing at least one characteristic of said physical interface, is coupled to said physical interface on the basis an output of means for measuring.

In one embodiment, the means for measuring comprises:
a first measure circuit measuring a first current provided from said terminal to said smart card via said physical interface,
a second measure circuit measuring a second current returned from said smart card to said terminal, and the terminal further comprises
a comparator connected to said first and second measure circuit and adapted to compare whether said first and said second current is substantially equal, and if not generating a signal representing that a circuit extending arrangement is present.

In an alternative embodiment, the terminal further comprises a comparator for comparing said measured at least one electrical characteristic with at least one electrical characteristics as calibrated during manufacture.

In one embodiment, the physical interface has been calibrated to create at least one viable, but non-stable, electrical property at the physical level, the at least one property allowing normal transaction with said smart card, but causing the interface to fail if an circuit extending arrangement is coupled to said physical interface.

In one embodiment, the at least one non-stable electrical property relates to current and/or voltage characteristics of said physical interface.

In one embodiment, the terminal further comprises:
means for regulating the use of the smart card on the basis of said signal from said comparator.

Further, the invention also relates to a computer readable medium having stored thereon instructions for causing one or more processing units to execute the method according to the present invention.

DESCRIPTION OF PREFERRED EMBODIMENTS

Figure 1:
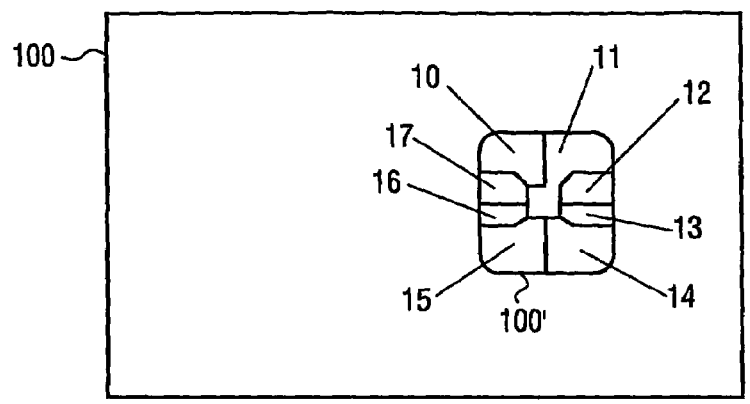
FIG. 1 schematically illustrates a smart card.

FIG. 1 schematically illustrates a typical smart card. Shown is a security card/a smart card (100) that is well known in the prior art. Typically the card (100) has the form of standard size credit card, although the form, layout, size, etc. may vary. The card (100) typically comprises embedded memory, a processor/controller and input/output (I/O) used for communication with an appropriate card reader/(sub-) terminal (not shown) via a number of contacts (100'). The shown contacts (100') (the size of which is exaggerated/enlarged for illustrative purposes) complies with the standard of ISO 7816 part 2 and comprises power supply (10), ground (11), three optional contacts/pins (12, 14, 15) that may be used for different functionality dependent on the specific card, a bidirectional input/output pin (13), check (16) and reset (17). All of these signals are provided by a terminal, receiving the card, to the smart card (100), and the terminal is expected to monitor the bi-directional input/output (13) according to the standard protocols in order to observe the response of the smart card (100).

Such a card (100) may be used to store information like PIN-codes, identification information, personal information, security information, etc.

Figure 2:
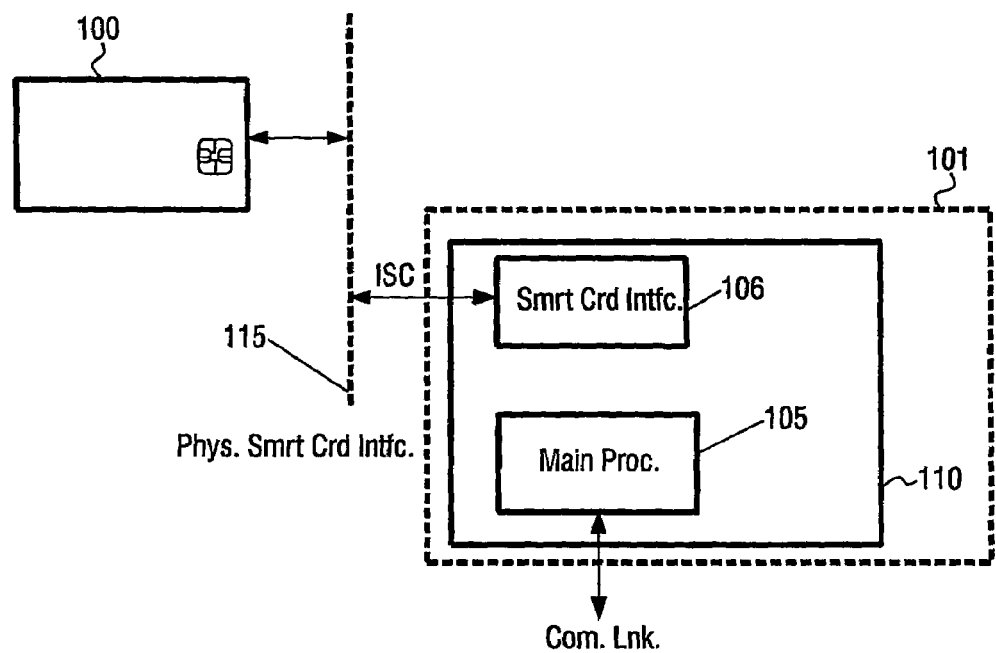
FIG. 2 illustrates a smart card and a prior art terminal.

FIG. 2 illustrates a smart card and a typical prior art terminal. Shown are the smart card (100) and the terminal (101) that communicates via a physical smart card interface (115). The terminal (101) comprises a main processor (105) and a generalized standard smart card interface (106) preferably integrated into or embedded in an integrated circuit (IC) (110) in the terminal (101). Optionally the terminal (101) also comprises a communications/IP link e.g. useful for various e-commerce applications and/or other functions.

When inserted in a private and/or home terminal/sub-terminal (101) (both forth denoted terminal), a smart card (100) would be supplied with power from a power supply from a central source, and the ground would be the central ground of the terminal's (101) electrical systems, since a smart card (100) does not have a power supply. Control signals of the physical smart card interface (115) in the terminal (101) would typically be provided by a serial smart card interface (106) programmed by the central processor(s) (105) of the terminal (101) to execute the standard protocols to address the smart card's physical interface (115). This is a very cheap and flexible arrangement, which allows developers of terminal/STB software to use standard electronic interfaces and processes to access the cards. However, the usage of a standard serial interfaces (106) makes the terminal (101) open to forms of tampering by spying on the communication, as described above.

Figure 3:
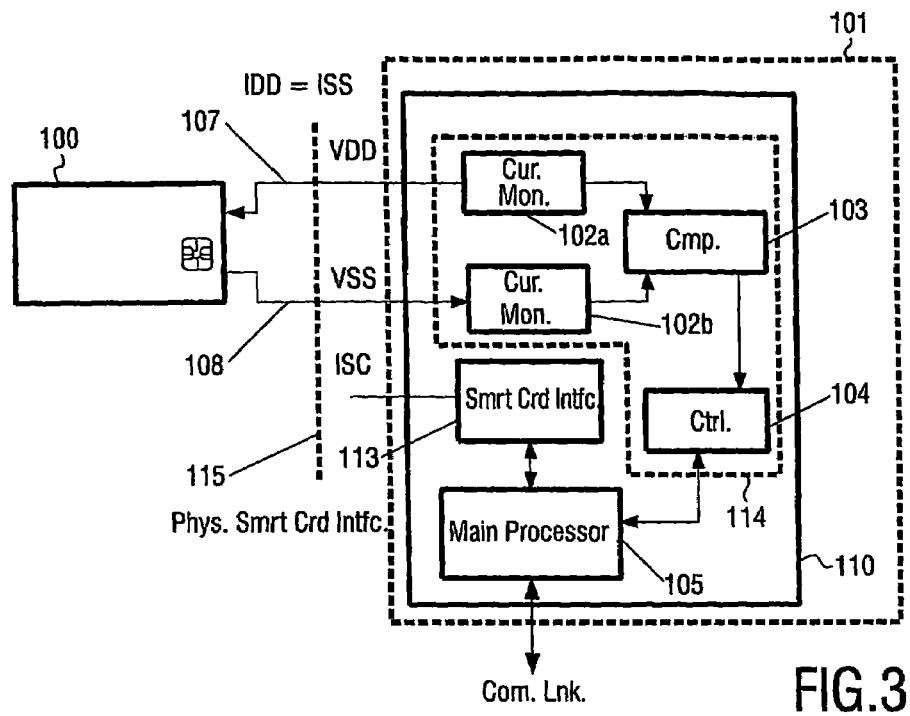
FIG. 3 illustrates an example of an un-tampered circuit according to the present invention.

FIG. 3 illustrates an example of an un-tampered circuit according to the present invention. Shown are a smart card/secure access card (100) and a terminal (101) modified according to the present invention. The smart card (100) and the physical interface (115) correspond to the ones shown and explained in connection with FIG. 2.

The terminal (101) corresponds to the one shown and explained in connection FIG. 2 with the exceptions that it comprises a specialized smart card interface/controller (113) instead of the generalized interface (106 in FIG. 2) and that it further comprises a monitoring/detection circuit (114), preferably integrated in/embedded into an IC (110), constituting the functionality of the terminal (101), and connected to the main processor (105) and the physical smart card interface (115).

Interface pins or other connections of the IC (110) is then directly coupled to the mechanical interface (115) that couples to the smart card (100). In this way, the IC (110) may be equipped with additional functionality allowing for electrical measurements of the physical/mechanical interface (115) to be made in order to detect tampering with the interface (115) which could allow for spying on the communication via the interface (115).

In the shown embodiment, the terminal (101) comprises a monitoring process done by the monitoring/detection circuit (114) that monitors and compares certain electrical characteristics of the physical interface (115), as explained in greater detail in the following.

As mentioned, a smart card (100) is an electrical circuit without internal power source(s) where a terminal (101) supplies the energy, i.e. the currents in the smart card (100).

This means that the sum of all DC and AC currents supplied to the card (ISC) must be returned to the source, i.e. the smart card interface/controller (113) in the IC (110) in the terminal (101). If there is a leakage of current (either DC and/or AC) from the source that is not returned back to the source then either interference and/or tampering must be present. Such tampering may e.g. be a monitoring/spy circuit, an extender, etc. with powered sensors/amplifiers. The monitoring/detection circuit (114) according to the present invention is able to sense either the AC or DC loss of current to return paths, i.e. sources, other than the terminal itself.

In the embodiment shown in FIG. 3, the monitoring/detection circuit (114) more specifically comprises a first current monitor (102a) coupled to a VDD connection (e.g. the power pin (10) in FIG. 1) and measuring/monitoring the current (denoted $I_{DD}$) and a second current monitor (102b) coupled to a VSS connection (e.g. the ground pin (11) in FIG. 1) and measuring/monitoring the current (denoted $I_{ss}$). The first and second current monitors (102a, 102b) are both connected to a comparator circuit (103) that compares $I_{DD}$ and $I_{SS}$ in order to determine if they are (substantially) equal or different (at all or by a factor greater than a predetermined factor), i.e. if $I_{SS}$ (substantially)=$I_{DD}$ or not. If they are equal, it signifies that that the current introduced to the smart card (100) from the terminal (100) is also returned again signifying that no tampering circuit has been inserted. If the currents are different (e.g. by more than a margin taking into account normal interference), it signifies that a spy circuit, tampering circuit, extending arrangement, etc. has been inserted.

The comparator (103) is connected to a controller (104) that on the basis of the signal received from the comparator (103) generates a control signal that is supplied to the main processor(s) (105). In this way, the main processor(s) (105) may initiate appropriate action(s) if a tampering circuit is detected. In the shown example, no tampering circuit is inserted and therefore the current introduced ($I_{SS}$) into the card is (substantially) equal to the current ($I_{DD}$) returned back to the terminal (100).

The detection circuit (110) may e.g. be a standard current mirror circuit comparing $I_{SS}$ and $I_{DD}$ using a window function determined by the controller (104) and executed by the comparator (103).

Preferably, the capability to re-calibrate the interface between the card (100) and the terminal (101) is not available in the terminal (101). At least not without, the use of special equipment only available at the manufacturing site.

An alternative embodiment comprises calibration of the interface used to create viable, but non-stable electrical properties at the physical level, e.g. time/timing, voltage and/or current, of the interface to the smart card (100). These properties should be viable enough to allow normal transaction with the card, but so dedicated to the electrical conditions that an insertion of circuit extending arrangement (111, 112), e.g. an extender, monitoring device, etc., would cause the interface to fail. The failure of the interface would thus resist the attack of tampering directly.

One implementation of this is to use an impedance-based method that uses current and/or voltage characteristics of the interface to create electrical conditions that are fragile. This is e.g. possible by creating driver circuits in the terminal (101) that are programmable to the electrical impedance of the signal path. Specifically these could use the signal path reflection characteristics. One condition for this may e.g. be that the signal transition time of the driver and a significant proportion of the flight time from source to receiver. In this case, the signal path has the properties of a transmission line thereby making an impedance-based method very practical.

Yet a further embodiment comprises a monitoring process that compares known electrical characteristics of the interface (as calibrated during manufacture) and the present conditions. The monitoring process would regulate the use of the smart card. If the present condition(s) of the actual card inserted into the terminal deviated from the calibrated conditions (e.g. at all and/or within a predetermined margin) then the terminal could e.g. either warn the user and/or the card issuing authority (e.g. using the communications/IP link). The transaction, the access, etc. relating to the card would then be terminated and/or carefully monitored by the execution/issuing authority.

Figure 4:
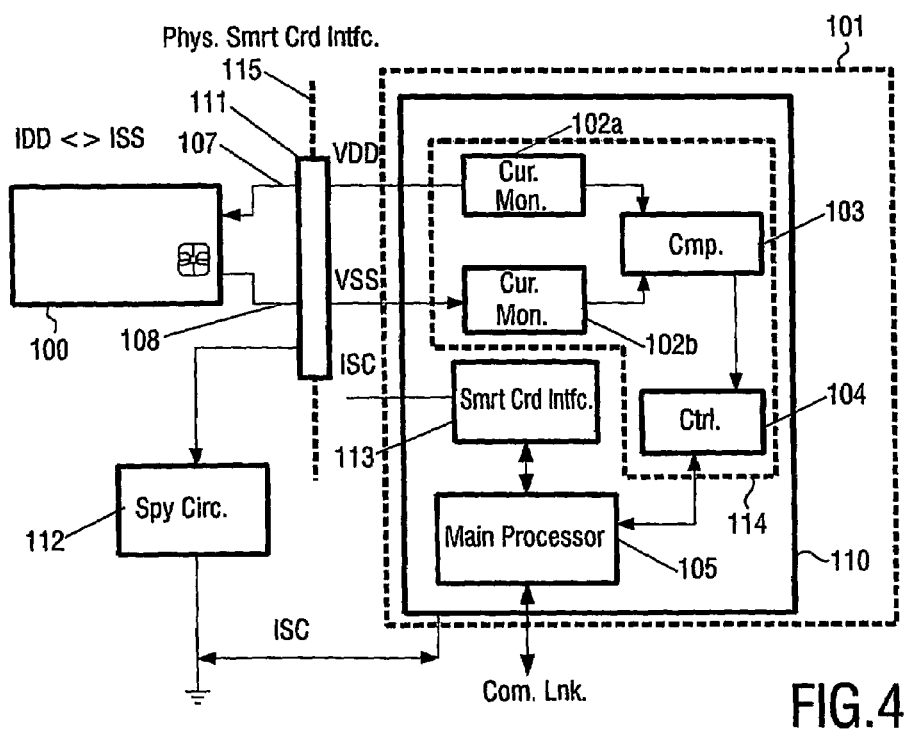
FIG. 4 illustrates an example of a tampered circuit according to the present invention.

FIG. 4 illustrates an example of a tampered circuit according to the present invention. Shown is the arrangement shown in FIG. 3 but with an extender (111) inserted and coupled to a spy/monitoring circuit (112). As the inserted extender (111) and/or spy circuit (112) introduces a 'leakage' of current, then $I_{SS}$ will be different from $I_{DD}$, i.e. all the current supplied by the terminal is not received back, which will be detected by the comparator (103) and signaled by the controller (104) to the main processor (105). In this way, attempts at spying, tampering, etc. is readily detected by simple means.

The invention claimed is:

1. A method of detecting a presence of a circuit extending arrangement inserted between a physical interface, connected to a terminal, and a smart card, the physical interface being adapted to receive the smart card, the method comprising:

measuring a first current provided from said terminal to said smart card via said physical interface, measuring a second current returned from said smart card to said terminal, and comparing whether said first and said second current is substantially equal, and determining whether a circuit extending arrangement is coupled to said physical interface on the basis said comparison.

2. Method according to claim 1, further comprising regulating the use of the smart card on the basis of said step of comparing.

3. A computer readable medium having stored thereon instructions for causing one or more processing units to execute the method according to claim 1.

4. A method of detecting a presence of a circuit extending arrangement inserted between a physical interface, connected to a terminal, and a smart card, the physical interface being adapted to receive the smart card, the method comprising the steps of:

measuring at least one characteristic of the physical interface, and determining whether a circuit extending arrangement, changing at least one characteristic of said physical interface, is coupled to said physical interface on the basis said measurement, wherein said physical interface has been calibrated to create at least one viable, but non-stable, electrical property at the physical level, the at least one property allowing normal transaction with said smart card, but causing the interface to fail if an circuit extending arrangement is coupled to said physical interface.

5. A method according to claim 4, wherein said at least one non-stable electrical property relates to current and/or voltage characteristics of said physical interface.

6. The method of claim 5, further comprising regulating the use of the smart card on the basis of said step of comparing.

7. The method of claim 4, further comprising regulating the use of the smart card on the basis of said step of comparing.

8. A terminal for detecting presence of a circuit extending arrangement inserted between a physical interface, connected to said terminal, and smart card, the physical interface being adapted to receive said smart card, the terminal comprising a monitoring circuit comprising:

a first measure circuit measuring a first current provided from said terminal to said smart card via said physical interface, a second measure circuit measuring a second current returned from said smart card to said terminal, and a comparator connected to said first and second measure circuit and adapted to compare whether said first and said second current is substantially equal, and generating a signal indicating whether a circuit extending arrangement is present on the basis of said comparison.

9. A terminal according to claim 8, further comprising means for regulating the use of the smart card on the basis of said signal from said comparator.

10. A terminal for detecting a presence of a circuit extending arrangement inserted between a physical interface, connected to said terminal, and smart card, the physical interface being adapted to receive said smart card, the terminal comprising a monitoring circuit comprising means for measuring at least one characteristic of the physical interface, and means for determining whether a circuit extending arrangement, changing at least one characteristic of said physical interface, is coupled to said physical interface on the basis an output of means for measuring, wherein said physical interface has been calibrated to create at least one viable, but non-stable, electrical property at the physical level, the at least one property allowing normal transaction with said smart card, but causing the interface to fail if an circuit extending arrangement is coupled to said physical interface.

11. A terminal according to claim 10, wherein said at least one non-stable electrical property relates to current and/or voltage characteristics of said physical interface.

12. The terminal of claim 11, further comprising means for regulating the use of the smart card on the basis of said signal from said comparator.

13. The terminal of claim 10, further comprising means for regulating the use of the smart card on the basis of said signal from said comparator.

* * * * *